April 29, 1924.  
G. H. CLEVENGER  
METHOD OF AND APPARATUS FOR THE HEAT TREATMENT OF ORES  
Filed Oct. 11, 1921  
1,492,286
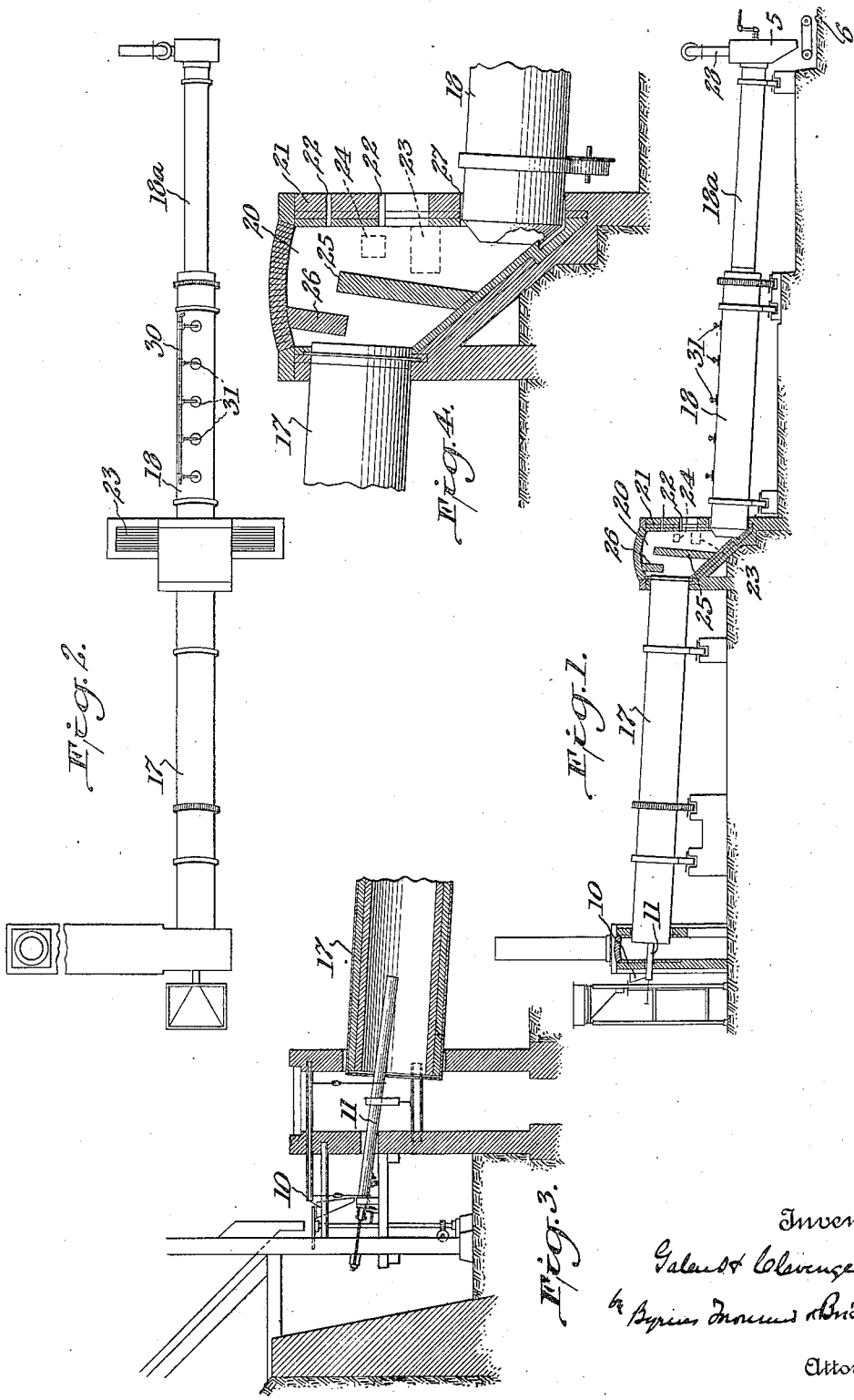

Patented Apr. 29, 1924.

1,492,286

UNITED STATES PATENT OFFICE.

GALEN H. CLEVENGER, OF BOSTON, MASSACHUSETTS, ASSIGNOR TO RESEARCH CORPORATION, OF NEW YORK, N. Y., A CORPORATION OF NEW YORK.

METHOD OF AND APPARATUS FOR THE HEAT TREATMENT OF ORES.

Application filed October 11, 1921. Serial No. 507,114.

*To all whom it may concern:*

Be it known that I, GALEN H. CLEVENGER, a citizen of the United States, residing at Boston, in the county of Suffolk and State of Massachusetts, have invented certain new and useful Improvements in Methods of and Apparatus for the Heat Treatment of Ores, of which the following is a specification.

This invention relates to a method of and apparatus for the heat-treatment of ores or other materials and more particularly to furnaces for continuously treating ores under precisely regulated conditions of temperature, reduction, oxidation, etc.

The invention is intended as an improvement upon the modes of treatment and the apparatus disclosed in my Patent No. 1,379,083 and my application Serial No. 433,355, filed Dec. 27, 1920.

For a full understanding of the invention, reference is made to the accompanying drawings, in which—

Fig. 1 is a view mostly in elevation but partly in section of an apparatus embodying the invention;

Fig. 2 is a plan view thereof;

Fig. 3 is a fragmentary sectional view of a special form of feed mechanism; and

Fig. 4 a sectional view on an enlarged scale of a structural detail.

The furnace illustrated includes three zones, viz, a preheating zone 17, a reducing zone 18 and a cooling zone 18ª.

The material to be treated is fed to the furnace by means of hopper 10 to a shaking feeder 11 which I preferably use instead of screw conveyer for the reason that it is better adapted for coarser material.

The material passes consecutively through the preheating zone, the reducing zone and the cooling zone to a stationary chamber 5 from the lower end of which it is discharged into a sump 6.

A suitable reducing gas, such as a producer gas is introduced through pipe 28 and flows upwardly through the kiln counter-current to the ore.

Air is supplied through a pipe 30 to the jets 31 and the rate of flow to the separate jets may be regulated by means of suitable valves, all as described in my said patent and said application.

I have found that for reasons to be more fully indicated, it is desirable to pass only so much gas into the furnace as is necessary to maintain reducing conditions.

In some cases it will be necessary to gasify the whole of the fuel in order that there be sufficient excess of unburned gas in the reducing zone to meet the requirements of reduction. In such cases a complete combustion of the unburned gases coming from the reducing zone at the point where they enter the preheating zone is or may be sufficient to produce the desired preheating effect. In such cases a combustion chamber such as disclosed in my said application will meet the requirements.

In other cases where a lower concentration of reducing gases suffice to produce the desired reducing conditions, the heat of combustion developed and utilized in the preheating zone is or may not be sufficient to produce the necessary heating effect in the preheating zone.

By gasifying only so much of the fuel as is necessary to bring about the proper reducing conditions in the reducing zone, the size of the gas producer plant is reduced and consequently the cost of installation becomes less. This practice also results in greater fuel economy, as certain of the thermal losses occurring in the gas producer are eliminated.

Furthermore, it has been found that in operating the reducing unit at the highest efficiency, it is necessary to carry a bed of considerable depth of ore or other material undergoing treatment. In order to avoid undue loss of material from the head end of the reducing section of the kiln it is necessary to constrict the discharge opening to correspond to the depth of bed employed. A very low pressure of gas in the reducing unit as well as a low velocity of the gases issuing from the reducing unit has been found to be the best practice. With a low velocity of gas at the exit, dusting is kept down to a minimum. With the discharge opening for the gases issuing from the reducing unit constricted to prevent loss of ore or other material undergoing treatment, if a low velocity of the gases issuing from this unit is to be realized, it is necessary to cut down the volume of gas passing through the unit. The herein described method of operation accomplishes this purpose.

For the reasons just pointed out I propose to gasify only so much of the fuel as is necessary for the best reducing conditions in the reducing zone and supply the additional amount of heat required for preheating the ore in the preheating zone to the desired temperature by burning additional fuel in a combustion chamber 19 intermediate the reducing zone and the preheating zone.

A portion of the heat for the preheating unit is secured by burning the unconsumed gases from the reducing unit in the combustion chamber and the balance by direct firing of fuel in the combustion chamber.

In order to bring about a complete combustion in the combustion chamber 20, I preferably provide an air inlet 27 immediately above the point at which the gases pass out of the reducing zone into the combustion chamber. I may further provide air inlets 22 in the wall 21 of the combustion chamber.

The fuel used may be liquid or solid, as desired or convenient. Either grates 23 may be provided for burning coal or other solid fuel or openings 24 (indicated in dotted lines) through which liquid fuel fumes may be projected into the combustion chamber.

I preferably apply baffles 25 and 26 of refractory material to promote complete combustion.

It is understood that there is considerable latitude in the selection of means for burning fuel in the combustion chamber to economically heat the incoming charge in the preheating zone.

I claim:

1. In a process of reducing ore, the steps which consist in supplying to a heated charge of ore so much gas as is required to furnish the necessary heat units for maintaining the proper temperature of reduction and for progressively reducing the charge, progressively burning a part of the gas to maintain the desired reducing conditions, passing the products of combustion obtained into contact with a fresh charge to preheat the same and conveying so much additional heat to the fresh charge as is necessary to raise the temperature thereof to the desired degree by separately burning fuel and passing the products of combustion into contact with the fresh charge.

2. In a process of reducing ore, the steps which consists in supplying to a heated charge of ore so much gas as is required to furnish the necessary heat units for maintaining the proper temperature of reduction and for progressively reducing the charge, progressively burning a part of the gas to maintain the desired reducing conditions, progressively withdrawing the gas from the charge and effecting a complete combustion thereof, passing the products of combustion into contact with a fresh charge to preheat the same and conveying so much additional heat to the fresh charge as is necessary to raise the temperature thereof to the desired degree by separately burning fuel and passing the products of combustion into contact with the fresh charge.

3. In apparatus of the character described, the combination with a reducing section and a preheating section, of means for supplying to the reducer section so much gas as is required to furnish the necessary heat units for maintaining the proper temperature of reduction and for progressively reducing the charge, means for controlling the rate of combustion of the gas, means for passing the products of combustion to the preheating section and means for supplying additional heat to the preheating section comprising a separate combustion chamber connected with the preheating section.

4. Apparatus according to claim 3 in which a combustion chamber is disposed between the reducing section and the preheating section and includes means for effecting a complete combustion of the gases coming from the reducing section.

In testimony whereof, I affix my signature.

GALEN H. CLEVENGER.